Oct. 31, 1933.  E. L. COPPINGER  1,932,955
LOADING METHOD AND APPARATUS
Filed Dec. 23, 1931  6 Sheets-Sheet 1
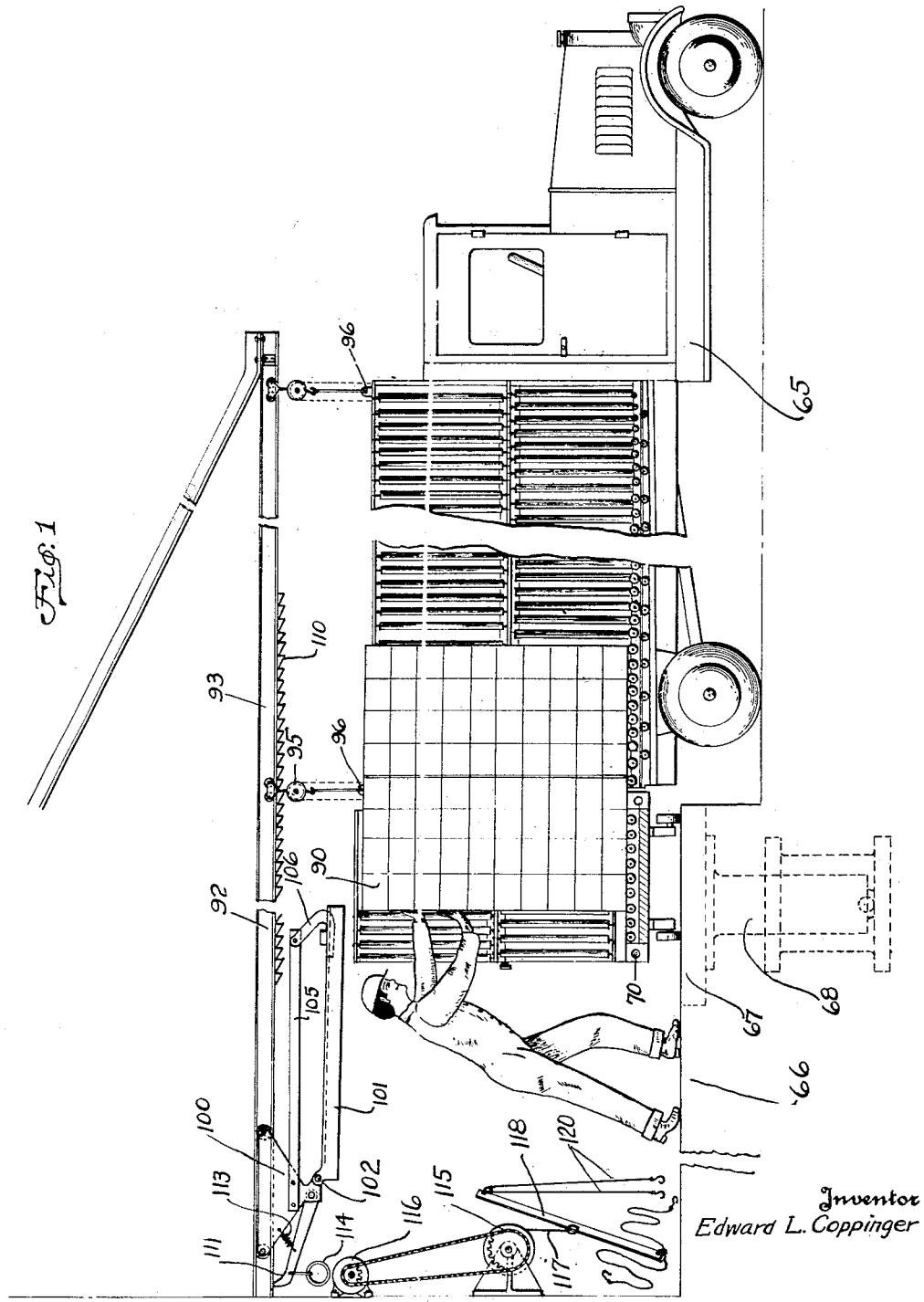
Inventor
Edward L. Coppinger
By A H Oldham
Attorney

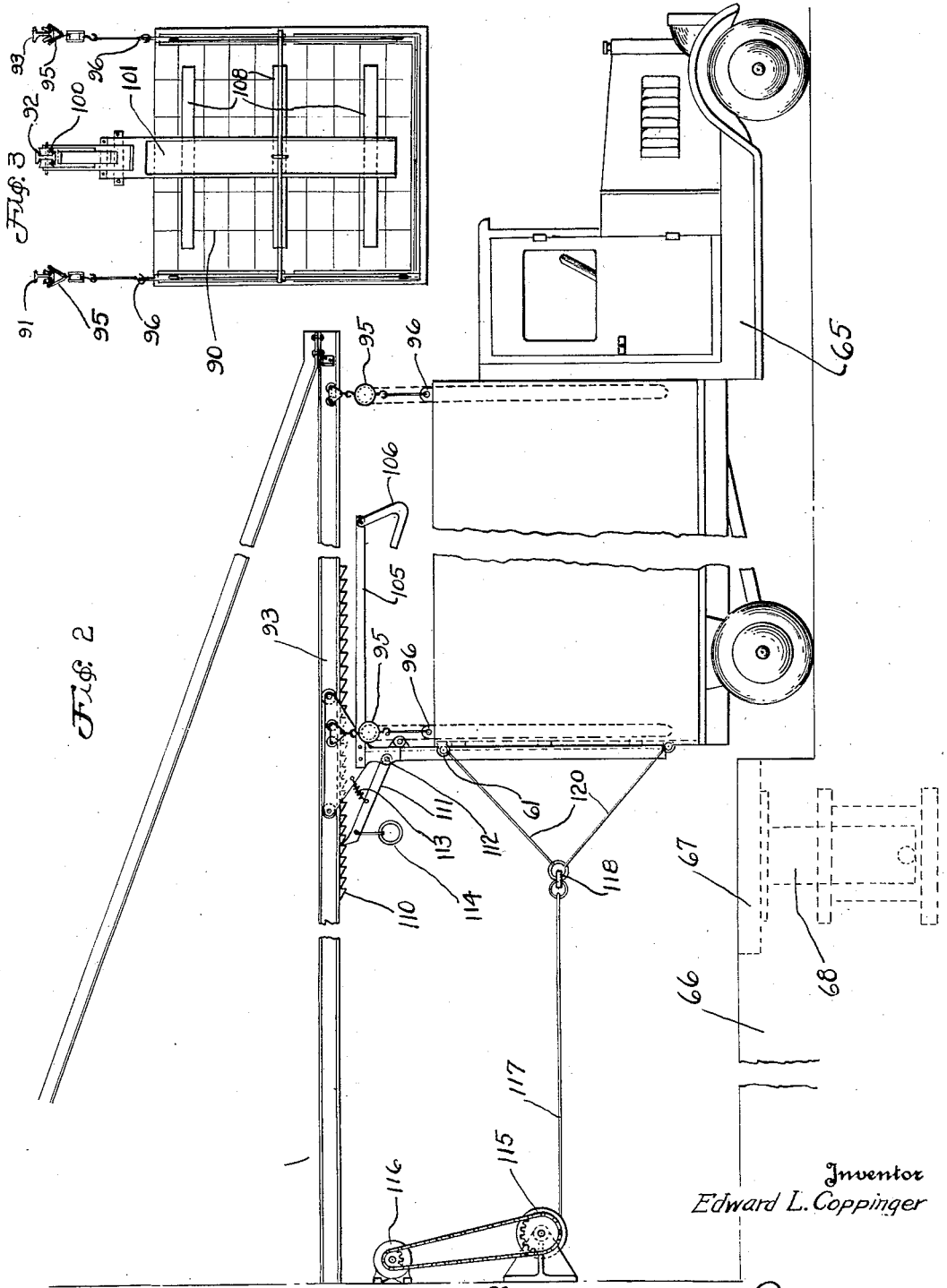

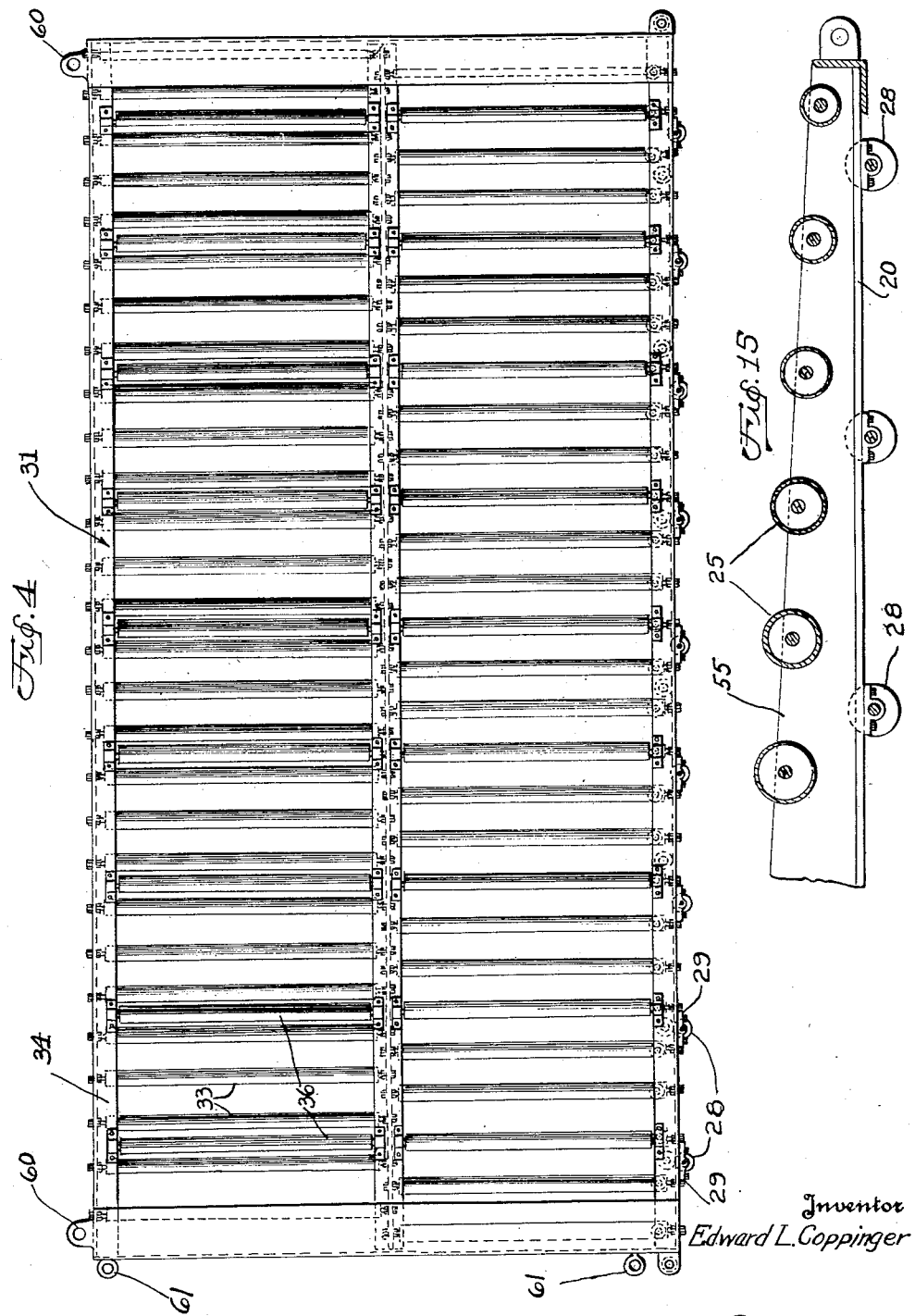

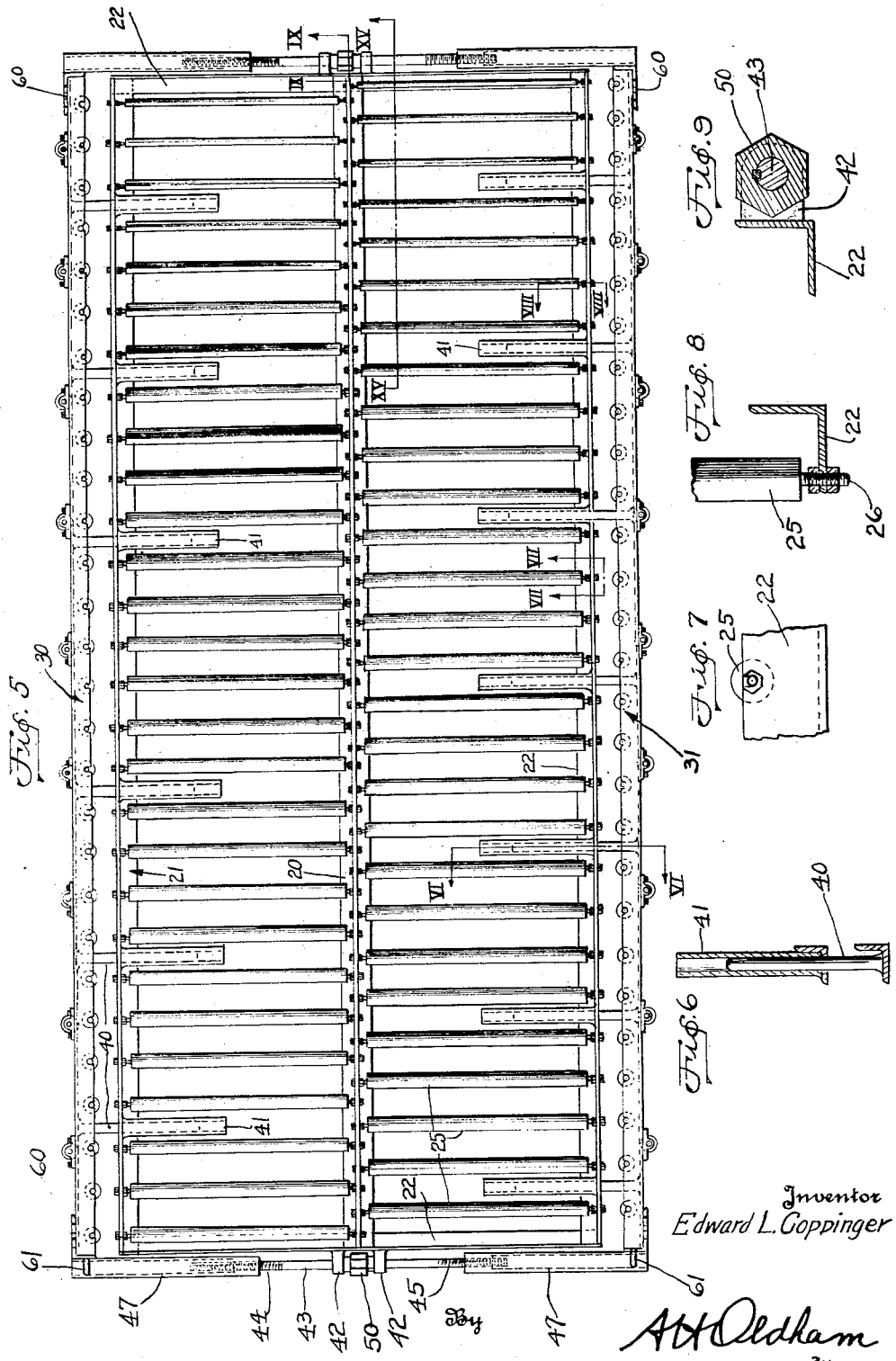

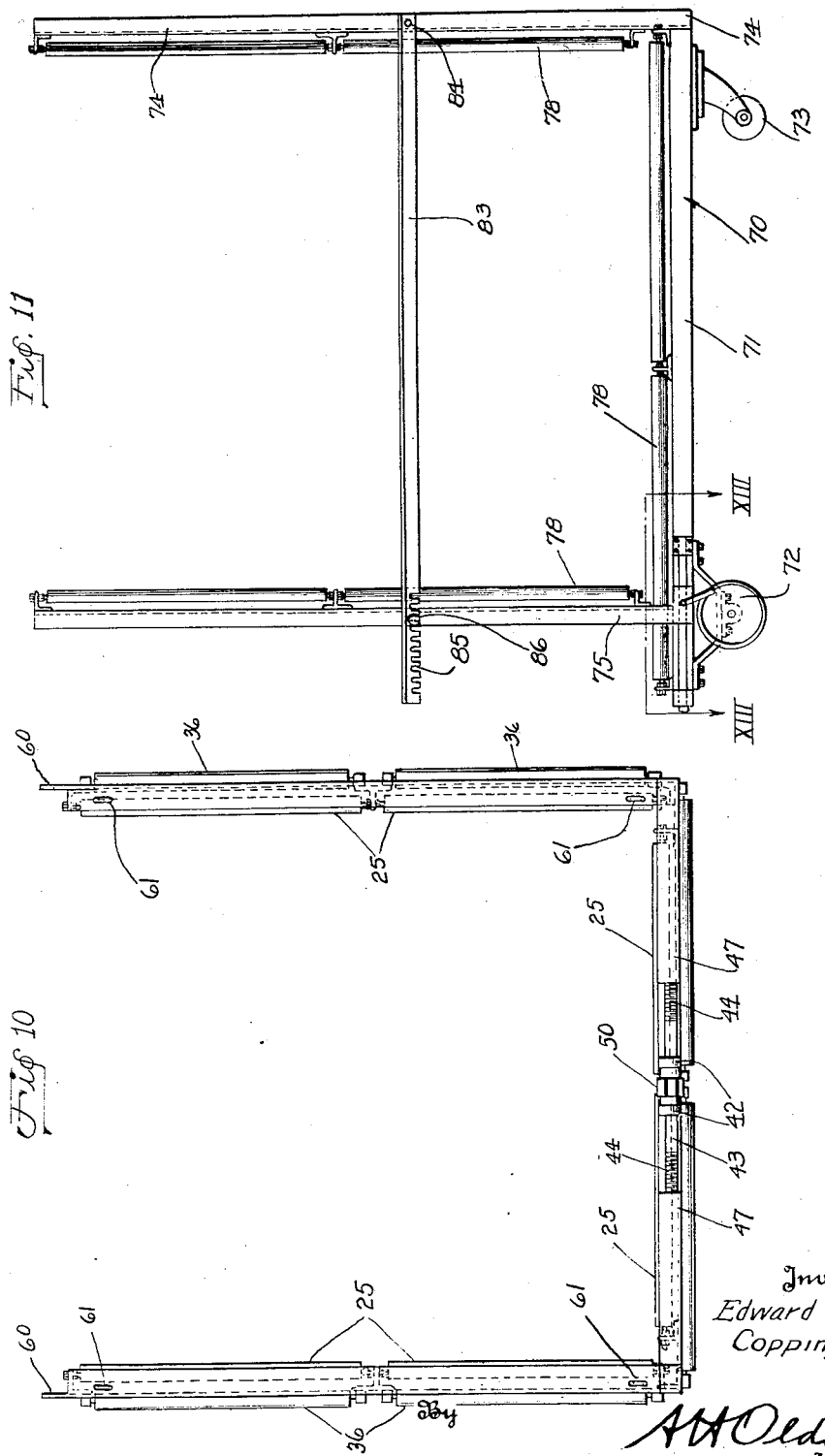

Oct. 31, 1933.  E. L. COPPINGER  1,932,955
LOADING METHOD AND APPARATUS
Filed Dec. 23, 1931  6 Sheets-Sheet 6
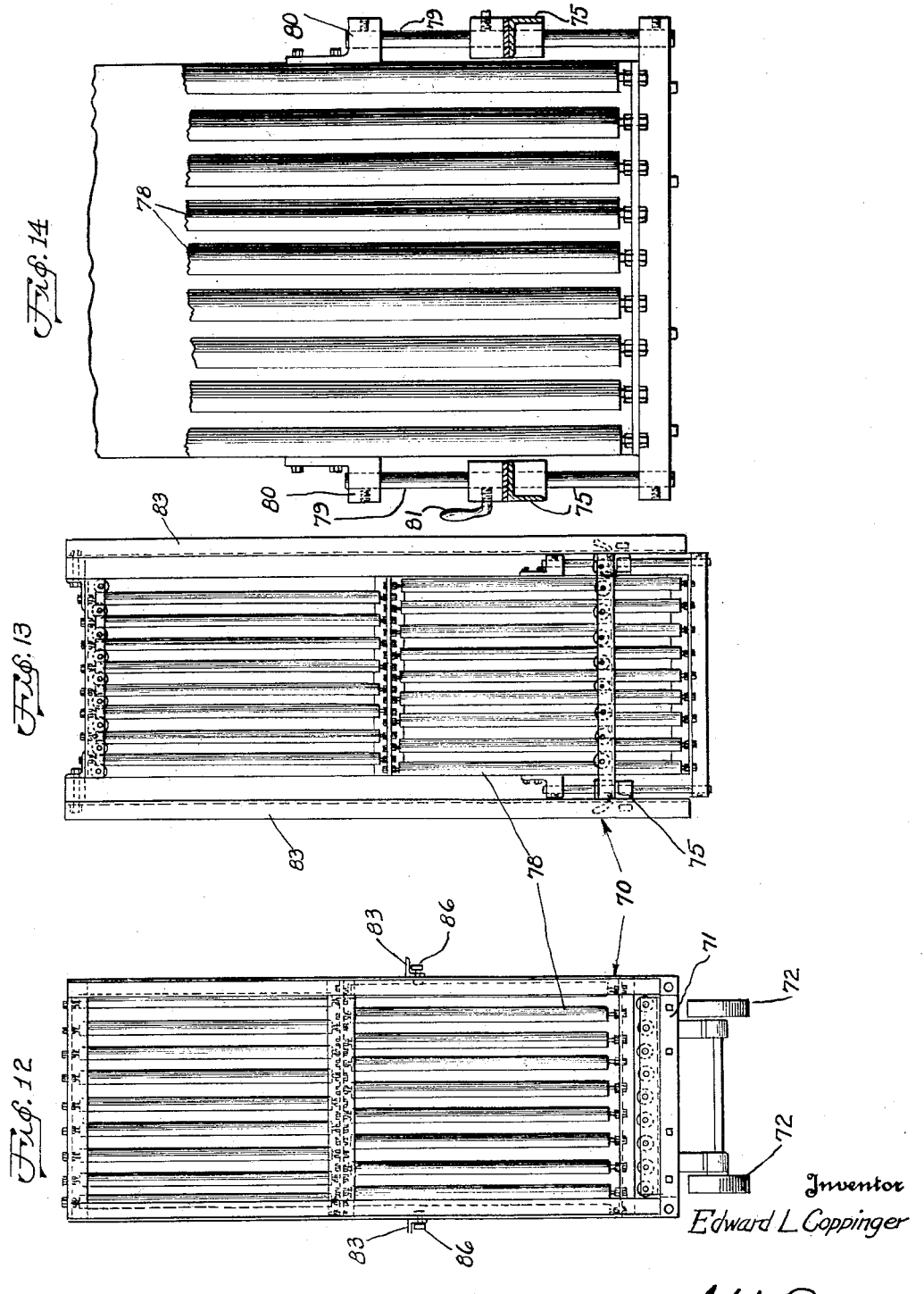
Inventor
Edward L. Coppinger
By
A H Oldham
Attorney Patented Oct. 31, 1933

1,932,955

UNITED STATES PATENT OFFICE 1,932,955

LOADING METHOD AND APPARATUS

Edward L. Coppinger, Akron, Ohio

Application December 23, 1931
Serial No. 582,767

11 Claims. (Cl. 214—38)

This invention relates to a method and an apparatus for loading, and more particularly refers to a method and apparatus for assisting in loading relatively large trucks, box cars, or the like. Heretofore in loading articles into a truck, trailer, box car, or the like, considerable time and labor was expended in handling each article several times and in carrying or removing the articles from the loading truck or platform to the bed of the truck or transporting vehicle. This is particularly true where the articles are comparatively small in size and large in number and where auxiliary hand trucks or the like are employed to bring the articles to proximity with the transporting vehicle. In this connection for example, it will take a plurality of men several hours to load a large truck with individually packed articles inasmuch as each article must be removed individually from the hand truck which carries them to the loading station, the articles being thereafter carried to the proper position in the truck and deposited.

It is an object of the present invention to avoid and overcome the undesirable waste in time and labor necessitated and extended in former known loading operations by the provision of a method and apparatus whereby the loading operation of substantially any article into almost any transporting vehicle can be expedited both as to time and labor.

Another object of the invention is to provide a method for rapidly and efficiently loading articles into transporting vehicles or the like, with a minimum of labor and apparatus.

Another object of the invention is to provide a simple, sturdy, relatively inexpensive apparatus for assisting in loading substantially any articles into a storage space which may be upon transporting means.

Another object of the invention is to provide suitable apparatus whereby articles deposited upon a hand truck and brought adjacent a loading station can be pushed into a truck or other transporting vehicle without rehandling and thus with a minimum of work and time.

Another object of the invention is to provide an apparatus to assist in storing articles which comprises a cage having a plurality of rotatable means on both the inner and outer surfaces thereof whereby the articles to be stored can be pushed or rolled into the cage and thus into the storage space in which the cage is placed, whereupon the articles can be held stationary while the cage is removed to leave the articles in the storage space.

Another object of the invention is to provide apparatus to assist in holding the articles in position when the cage is removed from the storage space.

Another object of the invention is to provide means for aligning the hand truck upon which the articles are brought to the transporting station with the transporting vehicle bed carrying the cage so that the same can be aligned vertically whereby the articles can be easily moved from the one to the other.

Another object of the invention is to provide a loading auxiliary of the type described wherein the same is constructed of tapering article carrying surfaces so that the auxiliary can be more easily removed after the loading or storing operation.

Another object of the invention is to provide a hand truck adapted to be employed in assisting in the loading operation and apparatus comprising the present invention.

The above and other objects of the invention are achieved by the method described hereafter and by the apparatus illustrated in the accompanying drawings, wherein:

Fig. 1 is a diagrammatic side elevation of the apparatus comprising the present invention illustrating it employed in conjunction with an auto-truck, certain portions of the truck being broken away to better illustrate the features of the invention;

Fig. 2 is a side elevation similar to Fig. 1, with the article abutting apparatus in position and with the cage removing means set to function;

Fig. 3 is a back or end elevation of the article abutting means shown in Figs. 1 and 2;

Fig. 4 is a side elevation of the cage or loading auxiliary included in the invention;

Fig. 5 is a plan view of the loading cage illustrated in Fig. 4;

Fig. 6 is a vertical cross-sectional view taken on line VI—VI of Fig. 5, illustrating the means for adjustably supporting the sides of the cage;

Fig. 7 is a horizontal sectional view taken on line VII—VII of Fig. 5, showing how the rollers are mounted in the cage;

Fig. 8 is a vertical cross-sectional view taken on line VIII—VIII of Fig. 5, also illustrating the manner in which the rollers are held;

Fig. 9 is a vertical cross-sectional view taken on line IX—IX of Fig. 5, illustrating the means for adjusting the sides of the cage;

Fig. 10 is an end elevation of the cage illustrated in Figs. 4 and 5;

Fig. 11 is a side elevation of the hand truck such as is normally employed in conjunction with the present invention;

Fig. 12 is an end elevation of the hand truck illustrated in Fig. 11;

Fig. 13 is a plan view of the hand truck illustrated in Figs. 11 and 12;

Fig. 14 is an enlarged plan view of one end of the hand truck shown in a plan view in Fig. 13;

Fig. 15 is a sectional view taken on line XV—XV of Fig. 5, illustrating the taper of the article supporting surface of the loading cage.

Referring to the drawings, applicant's apparatus comprising a part of the present invention and employed in the loading operation includes the loading cage illustrated in Figs. 4, 5, and elsewhere, which may take a plurality of forms, but which in the embodiment illustrated in the present patent application comprises an inverted T beam 20, which is secured longitudinally and medially of a rectangular frame 21 which may be built up from suitable angle iron indicated at 22. The vertically extending flanges of the inverted T beam 20 and the angles 22 serve to journal a plurality of transversely extending rollers 25, which are placed at spaced intervals to form a bed which will allow rolling movement thereover. The rollers 25 may take a plurality of forms and may be mounted in a number of different manners. However, as illustrated in Figs. 7 and 8, the rollers are provided with axles 26 which rest in suitable slots formed in the angles 22 and T beam 20.

The frame 21 must also be adapted to have rolling or sliding movement provided by suitable means on its under surface and to this end rollers indicated at 28 are provided which are journaled by suitable bearings 29 at their ends as shown in Fig. 4.

The cage is also adapted to be provided with sides having a construction similar in a general way to the bottom. These sides are indicated as a whole by the numerals 30 and 31 and include a plurality of rollers 33 upon the inner surface of a rectangular frame 34 formed in the same manner as that described above in regard to the frame 21. The outer sides of the side members 30 and 31 of the cage are provided with rollers 36 similar to the rollers 28 employed upon the base frame 21. The rollers 36 and 33 can be mounted in a manner similar to that described above in regard to the base frame 21.

The sides 30 and 31 of the cage are adjustably secured to the base frame 21 by any suitable means so that the width of the cage can be adjusted in order to take care of different sized loading or storage spaces provided on trucks, transporting vehicles, storage bins, or the like. These means may take a plurality of forms but can comprise a plurality of posts 40 which are secured to the side members 30 and 31 at spaced intervals as shown in Fig. 5. These posts or rods 40 extend slidably into casings 41 made of extra heavy pipe or the like, both the casings 41 and the posts 40 being welded in position. As a matter of fact the entire cage may be assembled by welding operations, not only to cut down the overall thickness of the sides of the cage, but also to increase the strength without increasing the weight.

To control the position of the side members 30 and 31 both ends of the base frame 21 are provided with a pair of brackets 42 which journal a shaft 43 threaded with opposite hands at its ends as at 44 and 45. The threaded ends 44 and 45 threadedly engage in hollow tubes 47 which are secured at their ends to the side members 30 and 31. A nut 50 is keyed to the shaft 43 between the brackets 42 and serves to provide means whereby the shaft 43 can be turned thus moving the side members 30 and 31 towards or away from the base 21.

Fig. 9 shows the construction of the nut 50 and the manner in which it is secured to the shaft 43.

In order that any articles which are placed in the loading cage during the loading operation will not interfere with the removing of the cage after the loading operation, the cage is designed in such a way that its removal is facilitated. This may be accomplished in a number of different ways. However, in Fig. 15 of the drawings two of these ways have been illustrated. For example, in this figure it will be seen that the diameter of the rollers 25 decreases towards the front or inner end of the cage frame, thus giving a taper to the inside of the cage which allows the same to be more easily removed.

Again, the angles and beams supporting the rolls may be provided with a taper such as indicated by the line 55 so that the inside of the cage will be given a corresponding taper even though it may be found more economical to provide rollers of substantially the same size. A combination of the two features will of course provide a still greater taper, whereby the removal of the cage will be very desirably facilitated. It will of course be understood that the cage can be tapered not only on the bottom but on the sides as well.

The four upper corners or edges of the cage are provided with eyes 60 whereby the cage can be lifted if desired. It is also necessary to provide the back or outward end of the cage with suitable eyes 61 whereby means can be secured to the cage to remove the same after the loading operation.

Referring now to Figs. 1, 2 and 3 of the drawings, the numeral 65 diagrammatically illustrates an auto truck such as normally employed in the shipping of articles from one place to another. The truck 65 as illustrated, is backed up to a loading platform 66, a portion 67 of which may be mounted upon a hydraulic ram or piston 68 whereby the levels of the loading and loaded vehicles may be synchronized.

A hand push truck, indicated generally at 70, is employed in conjunction with the present invention, which hand truck comprises a bed 71, any desired wheels 72 and 73 for supporting the same and ends 74 and 75. The bed 71 and the ends 74 and 75 may be made of any suitable construction. However, they preferably comprise angle irons adapted to facilitate the mounting of suitable rolling means thereon. These rolling means may take the form of a plurality of rollers 78 journaled in any suitable manner upon the bed 71 and the ends 74 and 75 of the hand truck 70.

It will be seen that the rollers 78 need only to be provided upon the upper and inner sides of the bed and ends respectively. Some means may be provided for making the end 75 of the hand truck adjustable with respect to the bed 71, which means may comprise a pair of shafts 79 secured by brackets 80 to the bed 71 of the truck. The angles forming the sides of the end 75 are suitably apertured so that a sliding fit upon the shaft 79 is achieved. A hand screw 81 is provided to lock the end 75 in the desired position with respect to the base 71.

In order to prevent any articles which are piled upon the hand truck 70 from sliding off when this is not desired, a retaining bar 83 is pivotally secured as at 84 to one end of the truck, while the other end of the retaining bar 83 is provided with a plurality of slots 85 which fall behind a screw 86 upon the other end of the hand truck. These retaining bars 83 are provided on both sides of the truck. It is within the concept of the invention to dispense with the retaining bars 83 and to provide means for locking the rollers 78 against rotation whereby any articles placed on the hand truck will be normally retained thereon without the exact size of the hand truck being defined in part by retaining bars.

Referring again to Figs. 1, 2 and 3, the numeral 90 indicates a plurality of articles which are to be transported, which articles are packed in boxes mounted one upon the other and in side by side relation as is ordinarily the custom in packing articles to be shipped.

To facilitate the process of the present invention and forming a part of the invented apparatus, an overhead track formed of three I-beams 91, 92 and 93 is secured over the top of the loading station. The outer I-beams 91 and 93 of this overhead track are provided with trolleys 95 which support hooks 96, which in turn are adapted to be secured to the eyes 60 at the four corners of the cage. The central I-beam 92 has a large trolley 100 which carries an apparatus adapted to be lowered behind the articles 90 after they are placed in the cage, and which will function to retain the articles 90 in the loaded position while the cage is removed.

This abutment apparatus may comprise a channel beam 101 which is pivotally secured to the trolley at 102. The formation of the hinge 102, as illustrated in Fig. 1, is such that the channel 101 can be swung down into a vertical position but cannot thereafter be moved past the vertical position, but will be held to act as an abutment. An extension arm 105 pivotally mounts a hook 106 which serves to retain the channel 101 in the inoperative position under normal circumstances. The channel 101 may be provided with a plurality of cross bars 108, which will assist in holding the articles 90 in the desired position during the cage removing operation.

As particularly shown in Fig. 2, a rack 110 may be secured upon the I-beam 92, which will cooperate with a latch bar 111 pivotally secured to the trolley at 112 to hold the abutment apparatus in the desired horizontal position. A spring 113 tends to hold the latching bar 111 in the latched position, while a ring 114 may be provided to unlatch the abutment mechanism.

Although the invention contemplates employing hand means for removing the cage after the loading operation, it may be advisable to employ some mechanical means for this purpose, particularly in large installations. To this end a winch 115 operated by a motor 116 and having a windup cable 117 may be provided. The windup cable 117 is secured to a spanner bar 118 to each end of which is fastened a pair of cable hooks 120.

The operation of the device will undoubtedly be understood from the foregoing description. However, a brief résumé thereof follows:

The articles 90 which are to be loaded upon the truck 65 are initially loaded upon the hand truck 70 in the usual manner and the hand truck 70 is rolled to the loading platform 66. The truck 65 is backed up to the loading station and the cage is placed in the truck. It may be necessary to adjust the width of the cage in the manner described above, and it may be that the cage will be either longer or shorter than the truck. However this is not important as long as the articles can be moved into the cage from the hand truck as hereafter described. The hand truck 70 containing the articles 90 is now moved up in alignment with the back end of the truck and the cage and the portion 67 of the loading platform mounted upon the hydraulic cylinder is adjusted, if necessary, to align the bed of the hand truck with the bed formed by the rollers of the cage base, and thereafter the worker will push the articles 90 off of the hand truck 70 and onto the bed of the cage and thus into the truck.

It will be necessary to lower the retaining bar 83 of the hand truck before this operation takes place, if the retaining bar is in the retaining position. This operation will be repeated with a second load of articles 90 being brought into alignment with the back of the truck and pushed into the cage which will push the articles already in the cage towards the front end thereof. The entire loading of the truck will thus be achieved by a very simple, rapid and non-laborious process, without rehandling the articles.

Once the cage or truck has been completely filled with the articles, the abutment apparatus is rolled out upon its trolley 100 and swung down into place behind the articles 90, in which position it is retained by the latch bar 111 falling into engagement with the rack 110.

The worker now brings out the spanner 118 and hooks the cable hooks 120 into the eyes 61 in the manner shown in Fig. 2. The winch 115 is now operated and will serve to pull the cage out of the truck, leaving the articles 90 therein, the same being retained in position by the abutment mechanism. The truck is now completely loaded and can go on its way.

A number of modifications of the foregoing method can be employed if such are desirable. These modifications include extending the I beam track supporting the cage into the warehouse so that the cage itself can be loaded with the articles rather than the hand trucks. Thereafter the cage can be rolled or carried out of the warehouse onto the loading platform and moved directly into the truck. The abutment mechanism can then be swung down into position and the cage removed as before, thus speeding up the loading operation still more and eliminating extra labor.

Various other modifications of applicant's process and apparatus will readily suggest themselves, and it is intended that these should be included as a part of the present invention. For example, if the vehicles to be loaded are of uniform size it may be found unnecessary to make the cage adjustable. Again, it may be found desirable to make the cage adjustable lengthwise as well as sideways. The cage may also be made adjustable in a vertical direction, although this is not generally necessary.

Many of the desirable characteristics of the present invention may be retained if a comparatively short length cage is employed which will serve to receive the articles from the hand truck and which can be pushed back into the transporting vehicle and thereafter pulled out from under the loaded articles, thence to go back for a second load. In this manner the advantageous results of the applicant's invention can be retained without necessitating a complete cage, although such is preferable. It may also be possible in certain instances to entirely dispense with the sides of the cage or auxiliary loading member and to employ the base only.

While the invention is particularly illustrated and described in conjunction with the transmission of articles by motor vehicle, it will be appreciated that the principles of the invention are readily applicable to the loading or storing of articles in substantially and vehicle or storing bin, or the like.

Again, it should be understood that the present invention contemplates loading or storing substantially any articles by the present process and apparatus. For example, irregularly shaped bodies can be very readily handled by the present invention. It is particularly adapted to handle boxed or baled goods of all types and sizes.

Again, it will be appreciated that the various features of the apparatus and the details of the process as disclosed above and illustrated in the accompanying drawings, can be widely varied if so desired. For example, the cage forming a part of the present invention may have any means desired forming the loading or sliding surface thereof. Thus balls held in sockets could be distributed over the surface of the cage to perform the same function as the rollers shown. The abutment mechanism and the cage removing mechanism can be modified in any manner as long as the respective operations are performed.

The invention of course contemplates replacing the winch and mechanical means for removing the cage and also the abutment mechanism with hand means, or will allow the worker to perform these functions himself without apparatus.

It may also be possible to remove the cage from the truck by providing abutmen mechanism on the truck itself and pulling the cage out from between the load and the truck by forward movement of the truck under its own power.

By the present invention rugged, simple, inexpensive apparatus has been provided to rapidly and efficiently load substantially any articles into any bin or vehicle with a minimum of labor. Inasmuch as the transporting vehicles are inoperative during the loading operations, the present invention will release these vehicles for longer periods of productive use.

In accordance with the patent statutes the best known form of the invention has been illustrated in the drawings and described in the specification. However, it will be understood that this is for the purpose of illustration only and that the scope of the present invention is defined in the appended claims.

What I claim is:

1. The method of loading articles into a vehicle for transportation which comprises providing a loading member having rolling means on both top and bottom surfaces thereof, placing said member in the vehicle in the space where the articles are to be loaded to, supporting the articles on loading means having a rolling surface, alining the loading means vertically with said loading member, rolling the articles off said means and onto the member positioned in the loading space, removing the loading means, holding the articles in the loading space and pulling the loading member out from under the loaded articles leaving the articles in loaded position in the vehicle.

2. The method of loading a transporting vehicle with articles which comprises loading the articles upon an auxiliary vehicle, providing a loading member on the transporting vehicle which vehicle functions to support said member, moving the auxiliary vehicle adjacent the transporting vehicle and in substantially vertical alinement with the loading member, sliding the articles off the auxiliary vehicle onto the loading member in the transporting vehicle, and pulling the loading member out from under the articles on the transporting vehicle to leave them in the loaded position.

3. Loading apparatus including a loading member, overhead supporting means for moving the loading member into the space into which the articles are to be loaded, means independent of the loading member for bringing the articles to be loaded adjacent the loading member means for vertically alining the last-named means and the loading member at which position the articles are adapted to be slid on the loading member, overhead means for holding the articles in the loaded space and means for pulling the loading member out from under the articles to leave them in the loaded position.

4. Loading apparatus including a loading member, means for initially moving the loading member into the space into which the articles are to be loaded, means for bringing the articles to be loaded adjacent the loading member at which position the articles are adapted to be slid on the loading member as it is supported in the loading space, means for holding the articles in the loaded space and means independent of the means moving the loading member into the loading space for pulling the loading member out from under the articles to leave them in the loaded position, said loading member being in the form of an open-ended cage and rolling means on the inner and outer surfaces thereof providing sliding contact therewith.

5. Apparatus for storing articles comprising auxiliary means having surfaces thereon adapted to facilitate sliding contact between the auxiliary means and any other objects, means above the auxiliary means and adapted to support the same as it is placed in the space where the articles are to be stored in which position the articles will be slid on the auxiliary means, adjustably positioned means for holding the articles in the stored position, means supporting said last-named means from above, and means for removing the auxiliary means.

6. Apparatus for storing articles comprising auxiliary means having surfaces thereon adapted to facilitate sliding contact between the auxiliary means and any other objects, trolley supporting means for carrying and placing the auxiliary means in the space where the articles are to be stored in which position the articles will be slid on the auxiliary means, trolley supported means for holding the articles in the stored position, said last-named means being adapted to be dropped down from above, and means for removing the auxiliary means.

7. Apparatus adapted to facilitate loading operations comprising an open-ended cage, rolling means on the inner and outer surfaces of said cage, an inner surface of said cage tapering from one end to the other so that the cage can be easily pulled out from under any articles loaded therein, and means for adjusting the size of the cage.

8. Apparatus adapted to facilitate loading operations comprising an open-ended cage, rolling means on the inner and outer surfaces of said cage, certain of said rolling means being of graduated size whereby an inner surface of said cage tapers from one end to the other so that the cage can be easily pulled out from under any articles loaded therein.

9. Apparatus adapted to facilitate loading operations comprising an open-ended cage, adjustable sides on said cage including laterally extending rods received in mating housings, and means for adjusting the position of the sides.

10. In combination in apparatus for loading articles a loading member adapted to be placed in the space into which the articles are to be loaded, carrying means to bring the articles to the loaded space comprising a base, sides on said base, rolling means on the top surface of the base and on the inner surfaces of the sides whereby the articles to be loaded can be slid off the carrying means onto the loading member, means for vertically alining the carrying means and the loading member and means for removing the loading member.

11. Loading apparatus comprising a base, rollers forming the surface of the base, sides adjustably secured to the base rollers forming the surface of the sides, and means for positively and simultaneously controlling the position of the sides.

EDWARD L. COPPINGER.